Dec. 22, 1964  R. O. WHITAKER  3,162,794
INTERMITTENT ELECTRIC MOTOR DRIVE SYSTEM
WITH DELAYED CONNECTION TO LOAD
Filed Sept. 20, 1961  2 Sheets-Sheet 1

R O Whitaker
INVENTOR.

Dec. 22, 1964  R. O. WHITAKER  3,162,794
INTERMITTENT ELECTRIC MOTOR DRIVE SYSTEM
WITH DELAYED CONNECTION TO LOAD
Filed Sept. 20, 1961  2 Sheets-Sheet 2

R O Whitaker
INVENTOR.

United States Patent Office 3,162,794
Patented Dec. 22, 1964

3,162,794
INTERMITTENT ELECTRIC MOTOR DRIVE SYSTEM WITH DELAYED CONNECTION TO LOAD
Ranald O. Whitaker, 3145 N. Delaware, Indianapolis, Ind.
Filed Sept. 20, 1961, Ser. No. 140,177
5 Claims. (Cl. 318—16)

This invention relates to mechanical drive systems in which a motor is intermittently coupled to a high torque load and more particularly to remote control systems for television in which such a motor is at times intermittently coupled to the tuner for changing channels and in which case it is desired that the coupling to the relatively high torque load represented by the tuner be delayed until the motor has had time to build up considerable momentum.

In accordance with the invention, a mechanical catch affixed to the output shaft of a motor and normally in an inoperative position may be moved to an operative position in which it will cause the motor to be coupled at one point in the rotation of the output shaft to a device to be driven. Approximately 180° from this point a mechanical tongue is installed which causes the catch to move from inoperative position to operative position. In juxtaposed position to the catch an electromagnet is placed which is of such strength that it cannot move the catch to operative position but can hold it in operative position once it has been moved there by the aforementioned tongue. The arrangement is such that activation of the electromagnet causes the motor to intermittently engage the device to be driven, but the first engagement can occur only after the motor has had approximately one-half revolution in which to build up speed.

More particularly and in the preferred system in which a motor of a remote control system is intermittently coupled to the tuner of a TV receiver, the mechanical catch is either pivoted off-center so that gravity causes it to normally lie in its inactive position or biased by a spring to normally assume its inactive position. The tuner shaft has affixed to it a serrated disc for engagement by the catch. A tongue fixed to the frame is positioned so that when the catch is 180° from that position in which it would engage the serrated disc, the tongue depresses the catch to its active position. The magnet is of such strength that it cannot pull the catch from its inactive position, but can only hold the catch in the active position after the catch has been placed in active position by the tongue. This prevents the catch from engaging the serrated disc until after the motor has had at least half a revolution to build up speed. This insures that the momentum of the motor will be sufficient to throw from one channel to the next the rather heavy inertial load associated with the tuner. In the preferred system the moment of inertia of the motor is increased by adding a flywheel to the armature shaft of the motor. This causes the angular momentum built up by the motor during the half-revolution to be increased.

One object of the present invention is to provide a simple system employing a novel mechanical catch which will be much less expensive to build than systems previously used for intermittently coupling a motor to a device to be driven. A second object is to provide a system in which only a very small signal power is required to operate an electromagnet which in turn causes the device to be driven to be coupled to the motor. A third object is to provide a system for driving the channel selector of a TV receiver in which the tuner will be caused to step quickly from channel to channel but will pause between steps so that the user may clearly distinguish the channel to which the receiver is tuned. A fourth object is to provide a system in which a much less powerful motor may be employed than would be required were the tuner operated directly.

The invention further resides in features of construction, combination, and arrangement hereinafter described and claimed.

For a more detailed understanding of the invention, reference is made to the accompanying drawings in which.

Figure 1:
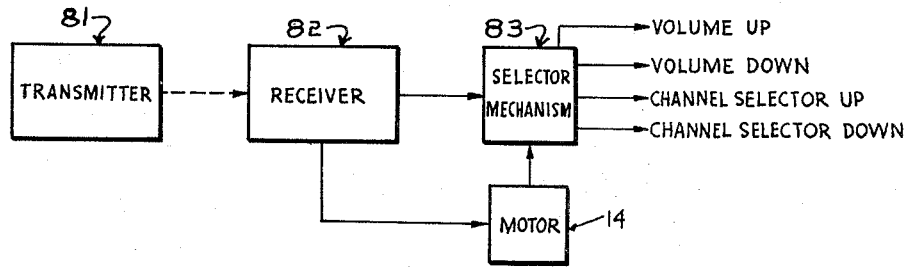
FIG. 1 is a block diagram of a TV remote control system in which the invention can be used.

In the system shown in FIG. 1, transmitter 81 consists of a transistorized 40 kc. oscillator feeding an ultrasonic transducer which in turn transmits an ultrasonic signal through the air to television receiver 82. Provision is made in transmitter 81 for modulating the ultrasonic carrier with one of several low audio frequencies selected according to which function is to be controlled. In a typical system frequencies might be assigned as follows:

| Frenquency: | Function |
|---|---|
| 75 cycles/sec. | Channel Selector Up. |
| 95 cycles/sec. | Volume Up. |
| 105 cycles/sec. | Channel Selector Down. |
| 135 cycles/sec. | Volume Down. |

Receiver 82 consists of a second ultrasonic transducer (to sense the ultrasonic signal transmitted by transmitter 81 and to develop a corresponding electrical signal) and a transistorized amplifier to amplify the small signal, rectify it, and recover the resultant audio signal therefrom. The output of receiver 82 is an audio signal corresponding in basic frequency to the modulating frequency employed at the transmitter.

Figure 2:
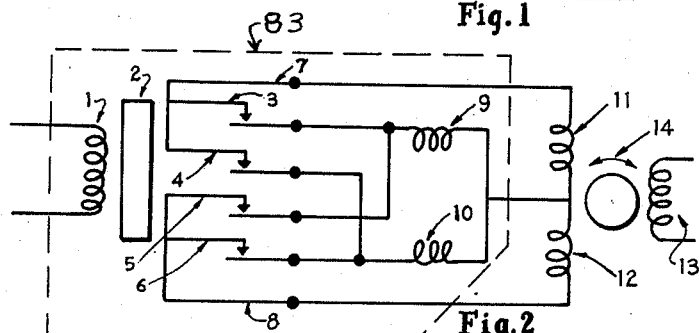
FIG. 2 is a schematic diagram of a suitable circuit for use with a drive mechanism incorporating the invention.

Selector mechanism 83 may be a vibrating reed relay. Referring to FIG. 2, the audio signal from the amplifier of receiver 82 is fed to coil 1, causing a corresponding magnetic field to build up in iron core 2. Resonant reeds 3, 4, 5, and 6 which are in the form of electrical contacts are excited by the magnetic field in core 2. That reed which is resonant at the particular frequency of the input signal will achieve a high amplitude of oscillation and cause closure of the corresponding contact.

In the system shown, a wound shaded pole motor indicated by 14 in FIG. 2 is employed. Motor 14 has a primary winding 13 which is continuously excited by the 110 volt 60 cycle line. Clockwise shaded winding 11 and counterclockwise shaded winding 12 are so positioned upon the magnetic members of the motor that completion of the electrical circuit through winding 11 causes motor 14 to turn in the clockwise direction and completion of the electrical circuit through winding 12 causes motor 14 to turn in the counterclockwise direction. Thus motor 14 can turn in either direction depending upon which winding is "shorted."

Activation of electromagnet 9 causes motor 14 to be coupled to the channel selector. Activation of electromagnet 10 causes motor 14 to be coupled to the volume control. Hence, closure of contact 3 causes motor 14 to begin to turn in the clockwise direction and at the same time activates electromagnet 9 and causes motor 14 to be coupled to the channel selector.

Similarly, closure of contact 4 causes the volume control to be operated in the clockwise direction.

Closure of contact 5 causes the channel selector to be operated in the counterclockwise direction.

Closure of contact 6 causes the volume control to be operated in the counterclockwise direction.

Figure 3:
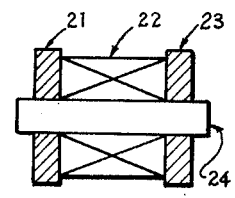
FIG. 3 is a sectional view of one form of electromagnet which can be used with the invention.

Electromagnets 9 and 10 are formed as indicated in FIG. 3. A cylindrical core of magnetic material 24 has pressed onto it two washer shaped pole pieces of magnetic material 21 and 23. Coil 22 of insulated copper wire is wound in the space between the pole pieces.

The remote control system discussed above including a 40 kc. ultrasonic transmitter and receiver, a vibrating reed relay, and a wound shaped pole motor drive unit is typical of the systems in which the invention may be used. However, the invention may also be used with many other basic systems. It may be used in systems using radio frequency electromagnetic waves instead of ultrasonic waves. It may be used in systems in which the intelligence is carried by discrete ultrasonic frequencies rather than by modulating frequencies. It may be used in systems employing cables rather than wireless links between the user and the television receivers.

Figure 7:
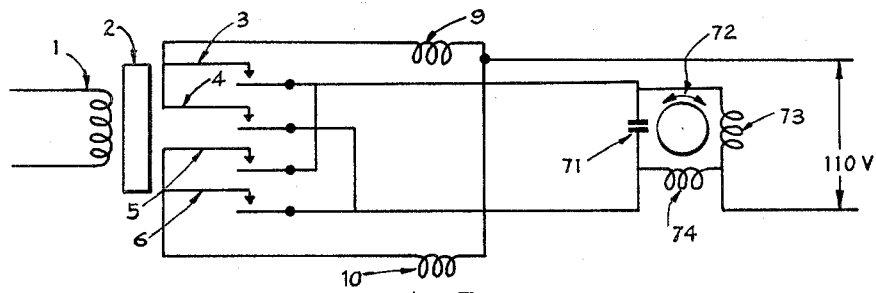
FIG. 7 is a schematic of a second suitable circuit for use with a drive mechanism incorporating the invention.

Further, other types of motors may be employed in place of the wound shaded pole motor discussed in the above system. FIG. 7 shows a selector mechanism incorporating a capacitor type motor. Application of A.C. power between the midpoint of windings 73 and 74 and one side of capacitor 71 causes motor 72 to rotate in one direction. Application of AC power between the midpoint of windings 73 and 74 and the other side of capacitor 71 causes rotation in the opposite direction. Passage of current through electromagnet 9 causes the channel selector to be coupled to the motor. Passage of current through electromagnet 10 causes the volume control to be coupled to the motor. Parts 1–6 are similar to parts 1–6 of FIG. 2. It follows that closure of the proper one of contacts 3 to 6 will cause operation of either of the two control functions in either of the two directions. Other forms of motors may be similarly adapted for use with the invention.

Further, it is not essential that electromagnets 9 and 10 be electrically connected to the motor control circuit. Without departing from the spirit of the invention, electromagnets 9 and 10 may be activated by a separate power source and a separate set of switches. In particular, electromagnets 9 and 10 may be controlled by the plate current of a vacuum tube or the output current of a transistor.

Further, other types of switches may be employed. The vibrating reed relay previously described may be replaced by individual relays—or by hand operated switches as described in U.S. Patent 2,743,797, issued May 1, 1956.

The invention of this application particularly deals with the mechanism for effecting control of the channel selector in response to closure of contacts 3 or 5 of FIG. 2.

Figure 4:
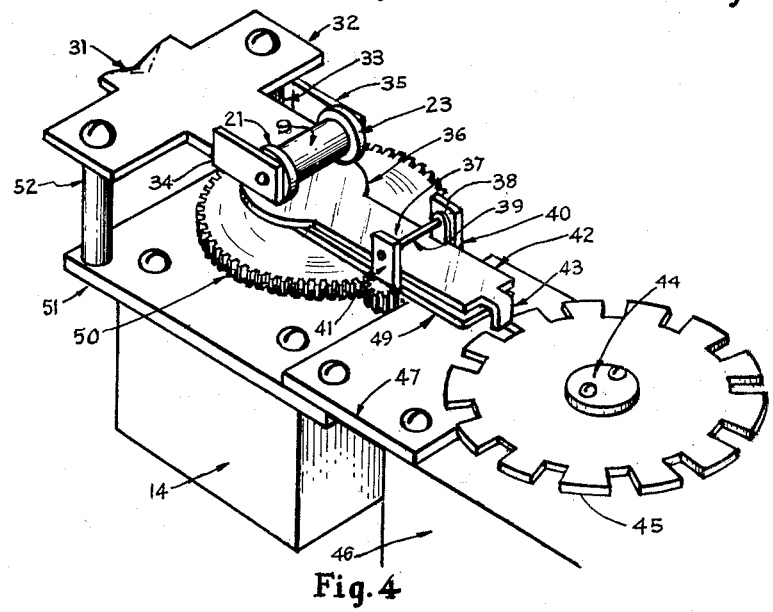
FIG. 4 is a perspective view of one form of tuner drive system incorporating the invention.
Figure 5:
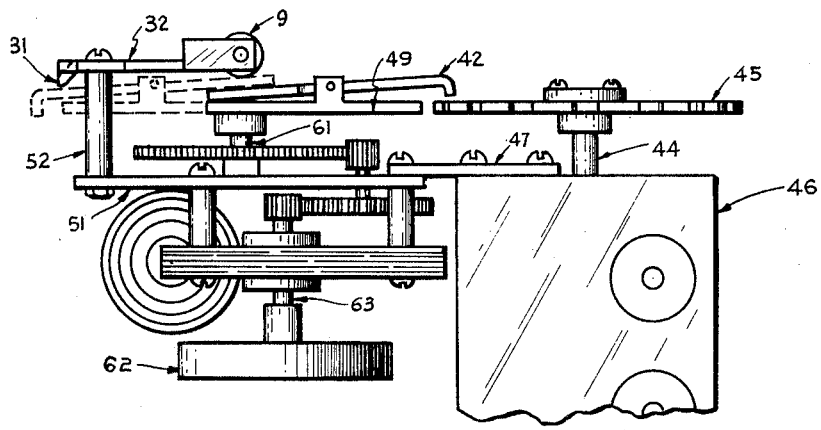
FIG. 5 is a front view of the drive system shown in FIG. 4.

In FIG. 4, electromagnet 9 is held in position by tabs 34 and 35 which are portions of bracket 32 bent upward therefrom. Bracket 32 is supported from motor face-plate 51 by spacers 33 and 52. The parts are so positioned that electromagnet 9 is centered over motor output shaft 61 as indicated in FIG. 5. Attached to motor output shaft 61 and rotating therewith is spinner 49. Referring to FIG. 4, tabs 40 and 41 bent up from spinner 49 serve to hold pin 39. Pivoted on pin 39 are tabs 37 and 38 of catch 42. Catch 42 has a rounded portion 36 (hereafter referred to as an armature) at that end which lies under electromagnet 9. Armature 36 is of such size that its weight tends to hold catch 42 in the position indicated by the solid lines in FIG. 5. This position of catch 42 in which gravitational action causes the armature to rest on motor shaft 61 is hereafter referred to as the "inoperative" position.

Without departing from the spirit of the invention, it would be possible to employ a spring bias to keep catch 42 in the inoperative position, rather than to shift weight so that gravitational action performs the task. In applications where omnidirectional operation is required, it will be necessary to balance the catch about its pivot and employ such a spring bias to keep it in the inoperative position.

Referring again to FIG. 4, motor 14 is affixed to motor face-plate 51. Motor face-plate 51 is attached to tuner 46 by plate 47. Tuner 46 is switched from channel to channel by rotation of shaft 44. Affixed to shaft 44 is serrated disc 45. Disc 45 has one serration for each detent position of the tuner. Serrations are positioned relative to the detent so that, when the tuner is in a detent position, the bridge between two serrations is centered upon the line connecting tuner shaft 44 and motor shaft 61.

Tip 43 of catch 42 is bent downward so that (for the inoperative position of catch 42) tip 43 just clears disc 45 as motor 14 turns. As indicated in FIG. 5, the operative position is achieved by rotating catch 42 about pin 39 so that armature 36 of catch 42 bears against magnet 9 and tip 43 drops down into the plane of disc 45.

Referring to FIG. 2 and FIG. 5, it is apparent that activation of coil 10 for operation of the volume control will not cause catch 42 to move to its operative position. Hence, as motor 14 turns in response to the signal to operate the volume control, tip 43 of catch 42 will float over disc 45 and the channel selector will not be operated.

Attention is next drawn to the fact that the detent of the tuner causes a high torque to be required for switching from channel to channel. Consequently, the motor must either have a high torque capability or must be given a chance to build up considerable momentum before engaging the channel selector. From the economy point of view, the latter is preferable since a motor of much less power capability may be used. For example, the motor may build up momentum during 300° of its rotation, and then use that momentum in driving the tuner during the other 60° of motor rotation.

In continuous switching of the tuner in one direction, the motor will always have (after activation) 300° in which to build up momentum before engaging the tuner. However, if electromagnet 9 is of such strength that it can draw catch 42 from the inactive position to the active position, the motor may have much less than 300° of rotation in which to build up speed when the system is first activated. Depending upon the position of spinner 49 with respect to disc 45, the angle available for momentum build-up might be 10° or oven zero. It is one object of this invention to provide a means whereby the motor will always have half a revolution in which to gather momentum before engaging the tuner.

Figure 6:
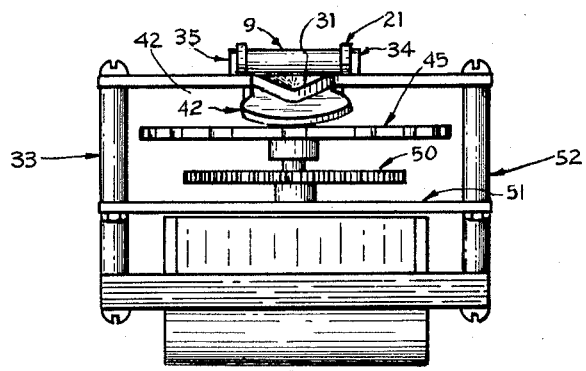
FIG. 6 is an end view of the drive system shown in FIG. 4.

Tongue 31 of bracket 32 is bent as indicated in FIGS. 4, 5, and 6 so that at each revolution of motor 14, catch 42 is engaged and caused to dip from inoperative to operative position as indicated by the dotted lines showing in FIG. 5. Electromagnet 9 is sufficiently weak that it cannot draw catch 42 from its inoperative position to its operative position, but can only hold catch 42 in the operative position once it has been tilted to that position by tongue 31. It follows that catch 42 can be brought to its operative position only while in position approximately 180° from engagement with the tuner. Hence, the motor will always have nearly half a revolution in which to build up momentum before engaging the tuner.

The momentum built up by motor 14 during that half revolution may be increased by fixing flywheel 62 to rotor shaft 63. Momentum could also be increased by attachment of flywheels to other shafts of the motor. However, minimum mass of system is achieved by attaching the flywheel to that shaft rotating at highest speed. Such attachment subjects the gears to shock action—however, experience indicates that this is not a serious shortcoming.

The system as described above will cause the motor to always have nearly half a revolution to build up speed before engaging the tuner. A relatively minor modification will permit this built-up time to be extended to a full revolution or more. This minor modification consists of reducing the depression of catch 42 produced by tongue 31. If motor 14 is rotating slowly when catch 42 passes under tongue 31, catch 42 will not tilt sufficiently to be held by magnet 9 and activation will not result. If the motor is turning quite rapidly when catch 42 passes under tongue 31, catch 42 will be literally "thrown" to its operative position. Once in the operative position, catch 42 will be held by electromagnet 9. Experience indicates that careful adjustment of parts can result in activation of catch 42 only after motor 14 has rotated well in excess of one revolution. However, a delay of more than approximately one revolution is hardly desirable from the customer's point of view.

Tongue 31 for moving catch 42 from the inoperative position to the operative position may be replaced by other means without departing from the spirit of the invention. One possible alternate mechanism is to physically restrain catch 42 from moving from inoperative position to operative position except at a point in the cycle of motor 14 approximately 180° from the point where the serrated disc would be engaged. For use with this new system electromagnet 9 would be made sufficiently strong to draw catch 42 to the operative position.

A second alternate mechanism involves the augmenting of the electrical signal. A cam operated switch operated by motor 14 could augment the electrical current in electromagnet 9 at a point in the cycle of motor 14 approximately 180° removed from the point at which catch 42 might engage serrated disc 45.

Let it be supposed that the user of the TV receiver desires to switch the receiver to a higher channel. Let it be further supposed that polarities of components are such that the following relationships hold:

| Function | Frequency, c.p.s. | Reed Number | Motor Direction |
|---|---|---|---|
| Channel Selector Up | 75 | 3 | Clockwise. |
| Volume Up | 95 | 4 | Do. |
| Channel Selector Down | 105 | 5 | Counter-clockwise. |
| Volume Down | 135 | 6 | Do. |

In order to switch the receiver to higher channels, the user will cause his transmitter to transmit a 75 c.p.s. modulated ultrasonic signal. The receiver will receive the signal, amplify it, rectify it, and deliver the recovered audio signal to coil 1 of the resonant reed relay. The signal will cause resonance in reed 3 and consequent closure of the contact associated therewith. Completion of the circuit through electromagnet 9 and shaded winding 11 causes motor 14 to begin to turn. When catch 42 passes under tongue 31 it will assume the dotted position indicated in FIG. 5. Having been placed in this operative position by tongue 31, it will remain there due to the action of electrogmagnet 9 which is energized. Upon further rotation of motor 14, tip 43 of catch 42 moves into a serration of serrated disc 45, and causes the tuner to be switched one position. Upon further rotation of motor 14, catch 42 continues to engage the serrated disc at this point in the cycle and to switch the tuner one position for each revolution of the motor. The user observes the channel indicator of the receiver and when the desired channel is reached, he causes the transmitter to cease sending the signal. Contact 3 immediately opens, current flow ceases, electromagnet 9 is deenergized, catch 42 falls to its inactive position, and motor 14 decelerates and stops.

To switch the receiver to a lower channel, the user causes the transmitter to send a 105 c.p.s. modulated ultrasonic signal. This causes closure of contact 5 which in turn causes energization of electromagnet 9 and counter-clockwise rotation of motor 14. The resultant action is closely similar to that described above.

When the volume control is operated, current is passed through coil 10 of FIG. 2 but not through coil 9. Motor 14 turns, causing catch 42 to pass beneath tongue 31 and by tongue 31 to be depressed to its operative position. However, magnet 9 is not activated and consequently does not hold catch 42 in the operative position. Upon passing from beneath tongue 31, catch 42 drops back to the inoperative position and the channel selector is not disturbed.

Reference is made to U.S. Patent 2,743,797 for structure and description of a possible drive mechanism for the volume control.

What is claimed is:

1. In a remote control system for a television receiver, a tuner having a means adapted to be driven to change channels, a selector system including a motor having an output shaft, and a stationary electromagnet, said selector system being responsive to a signal for driving said motor and energizing said electromagnet, connector means having an armature in operative relation with said electromagnet and a catch adapted to drivingly engage said means to be driven, said connector means being connected to said motor output shaft for rotation therewith and normally adapted to assume an inoperative position, and stationary means arranged in the path of rotation of said connector means for engaging and moving said connector means to its operative position, said last-named means being positioned to engage said connector means at a point in the rotation of said connector means approximately one-half revolution of said motor prior to the engagement of said catch with said means to be driven, the energization of said electromagnet retaining said connector means in said operative position to drive said tuner upon energization of said electromagnet.

2. The invention set forth in claim 1 in which said means adapted to be driven includes a disc with a plurality of serrations on its periphery, said disc being positioned relative to the path of rotation of said connector so that said catch moves into one of said serrations to turn said disc one serration for each revolution of said motor output shaft when said connector means is in operative position whereby said tuner is changed one channel for each revolution of said motor output shaft.

3. In a remote control system for television receivers, a channel drive system comprising a signal source, and electromagnet activated by a signal from said signal source, a motor activated by a signal from said signal source, said motor having an output shaft, connector means rotated by said motor and including an armature positioned opposed said electromagnet, support means affixed to said motor output shaft and supporting said connector means so that said connector means may be pivoted to bring said armature into operative position with said electromagnet, a tuner having a shaft to be rotated for changing channels, a serrated disc affixed to said tuner shaft and positioned relative to said connector means so that for each revolution of said motor output shaft when said armature is in position nearest said electromagnet said serrated disc will be engaged by a portion of said connector means and caused to throw said tuner one channel, transfer means for causing said connector means to pivot bringing said armature into close proximity to said electromagnet at a time in the rotation of said motor output shaft when said connector means is removed from that position in which engagement with said serrated disc could be effected.

4. A tuner drive system comprising
   a tuner having a shaft to be rotated to change channels,
   a motor to be intermittently coupled to said shaft for rotation of said shaft,
   coupling means for intermittenly engaging said motor to said shaft when said coupling means is in operative position,
   stationary transfer means for moving said coupling means from inoperative position to operative position at a time in the cycle of said motor shaft approximately one-half revolution of said motor prior to the engaging of said coupling means with said tuner shaft, and stationary holding means which when activated holds said coupling means in operative position after being so placed by said transfer means.

5. A drive-assembly for a tuner shaft of a multichannel television receiver, said drive-assembly comprising a motor energized in response to a channel-change signal and having an output shaft, a drive member coupled to said tuner shaft, connector means coupled to said motor output shaft for rotation about an axis displaced from the axis of rotation of said drive member, said connector means being pivotally mounted for movement between a normal inoperative position and an operative position in which it engages said drive member once per revolution to advance the tuner shaft step-by-step, a tongue extending into the path of rotation of said connector means to move it to said operative position at a point not less than about 180° in advance of its point of engagement with said drive member, and an electromagnet positioned adjacent the path of rotation of said connector means for holding said connector means in its operative position so long as said signal continues for continued stepping of the tuner shaft.

References Cited by the Examiner
UNITED STATES PATENTS 2,530,563   11/50   Baxter et al. _____ 74—112 X
2,743,797   5/56   Whitaker _____ 318—208 X ORIS L. RADER, *Primary Examiner*.

UNITED STATES PATENT OFFICE
CERTIFICATE OF CORRECTION

Patent No. 3,162,794            December 22, 1964

Ranald O. Whitaker

It is hereby certified that error appears in the above numbered patent requiring correction and that the said Letters Patent should read as corrected below.

Column 3, line 12, for "shaped" read -- shaded --; column 4, line 49, for "oven" read -- even --; column 6, line 50, for "opposed" read -- opposite --.

Signed and sealed this 18th day of May 1965.

(SEAL)
Attest:

ERNEST W. SWIDER
Attesting Officer

EDWARD J. BRENNER
Commissioner of Patents